United States Patent [19]

Batzar

[11] Patent Number: 4,818,350
[45] Date of Patent: Apr. 4, 1989

[54] METHOD OF MAKING A RICE COOKER

[76] Inventor: Kenneth Batzar, 1712 Lark La., Cherry Hill, N.J. 08003

[21] Appl. No.: 902,024

[22] Filed: Aug. 25, 1986

Related U.S. Application Data

[62] Division of Ser. No. 751,571, Jul. 3, 1985, abandoned.

[51] Int. Cl.$^4$ .............................................. C23C 28/00
[52] U.S. Cl. .......................................... 204/29; 72/46; 72/347; 204/38.3
[58] Field of Search ...................... 204/38.3, 29; 72/46, 72/347; 428/215, 421, 422

[56] References Cited

U.S. PATENT DOCUMENTS

| | | | |
|---|---|---|---|
| 4,011,361 | 3/1977 | Vassiliou et al. | 428/422 |
| 4,049,863 | 9/1977 | Vassiliou et al. | 428/324 |
| 4,169,083 | 9/1979 | Vassiliou et al. | 260/23 XA |
| 4,180,609 | 12/1979 | Vassiliou et al. | 428/212 |
| 4,252,859 | 2/1981 | Concannon et al. | 428/422 |
| 4,351,882 | 9/1982 | Concannon | 428/422 X |
| 4,353,950 | 10/1982 | Vassiliou et al. | 428/195 |
| 4,546,141 | 10/1985 | Gebauer | 428/422 X |

Primary Examiner—John F. Niebling
Assistant Examiner—William T. Leader
Attorney, Agent, or Firm—Richard H. Burgess

[57] ABSTRACT

An aluminum insert for a rice cooker is coated before drawing with a three-layer release coating. The coated insert is then deep drawn without damaging the coating. The coating has a high proportion of polytetrafluoroethylene to polyamide-imide and a low level of colloidal silica in the primer. After drawing, the uncoated exterior of the insert may be anodized to provide a durable, attractive finish.

3 Claims, 1 Drawing Sheet

METHOD OF MAKING A RICE COOKER

This application is a division of application Ser. No. 751,571, filed July 3, 1985, abandoned.

BACKGROUND

Rice cooker inserts provide a particularly challenging opportunity for non-stick or release coatings.

Such inserts are generally deep drawn from aluminum alloy and are anodized to provide a durable, attractive finish on the outside. Such inserts are used in electrically heated rice cookers which may be kept hot for many hours in the day or even continuously in residential kitchen use. In the presence of steam generated in the rice, starch from the rice and any other ingredients used tend to stick tenaciously to the insert.

Presently available coatings for rice cooker inserts tend to crack during deep drawing, to develop stains from oils and water in manufacture and use, and to develop blisters during use. Such coatings include clear polytetrafluoroethylene applied in a single coat to an electrolytically etched aluminum alloy blank or disc and rolled or pressed into the surface of the disc, before deep drawing of the insert.

Superior coating systems are desirable. Although good coating technology is known, including the primers of U.S. Pat. Nos. 4,011,361 - Vassiliou et al. (Mar. 8, 1977) and 4,049,863 - Vassiliou (Sept. 20, 1977), and the systems of 4,169,083 (Sept. 25, 1979), 4,180,609 (Dec. 25, 1979), and 4,353,950 (Oct. 12, 1982) - all to Vassiliou, optimum integrated coating systems for rice cookers are not known. These patents are incorporated herein by reference.

SUMMARY OF THE INVENTION

The present invention provides a coated aluminum alloy blank to be deep drawn to make a rice cooker insert wherein the coating is a multi-layer release coating which facilitates removal of food residues from the finished rice cooker insert, comprising a primer coat, an intermediate coat and a topcoat, said primer coat comprising polytetrafluoroethylene and polyamide-imide in a weight ratio of from 4:1 to 10:1 along with from 1.5 to 10% by weight colloidal silica, based on the solids content of the primer, said intermediate coat comprising polytetrafluoroethylene, pigment and coalescing agent which can be decomposed by heat at temperatures used to cure the coating system, and said topcoat comprising polytetrafluoroethylene, coalescing agent which can be decomposed by heat at temperatures used to cure the coating system, catalyst to enhance such decomposition, and mica flake or pigment-coated mica flake.

In preferred embodiments, in the primer coat the weight ratio of polytetrafluoroethylene to polyamide-imide is about 7:1 and the colloidal silica is present at about 3.1% by weight.

Preferably, the total dry film thickness of the coating is about 12.5 to 87.5 μm, the primer coat dry film thickness is about 2.5 to 15 μm, and the ratio of the dry film thickness of the intermediate coat to that of the topcoat is about from 1:3 to 3:1.

More preferably, the primer coat thickness is about 7.5 to 10 μm, and the ratio of thickness of the intermediate coat and topcoat is about 1:1.

The invention also provides a process of deep drawing an article of claim 1 at a draw ratio between 1.4:1 and 2.5:1 to produce an insert with the coating on the inside of the insert.

DETAILED DESCRIPTION

In order to obtain the desired improvements in coating performance, a three-coat system is needed in which a primer is tailored for good adhesion to the substrate and to the intermediate coat, the intermediate coat is selected to give good hiding of stains and barrier properties, and the topcoat is selected for optimum release and appearance. The overall system must be very formable to permit deep drawing of the coated blank, and the coating system must be resistant to the effects of anodizing the exterior of the insert after drawing and must resist blistering, pinholing and other coating defects.

It has been found that the primer should have a relatively high proportion of polytetrafluoroethylene to polyamide-imide and a low level of colloidal silica. Preferably, the coating thicknesses are kept low enough to not interfere with drawing but are high enough to give the desired coating properties. The terms polytetrafluorethylene and polyamide-imide as used herein include modifications of the polymers which are understood in the art to be generally equivalent to such polymers.

Figure 1:
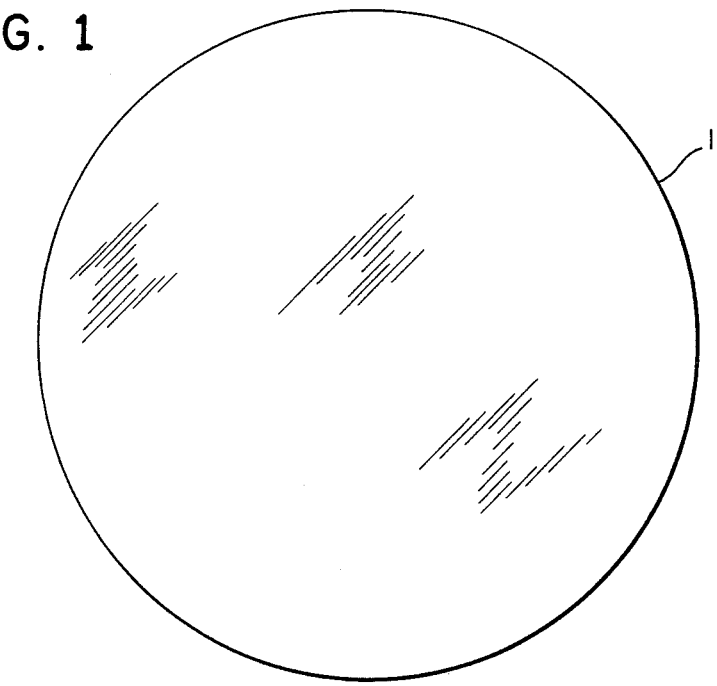
FIG. 1 is a plan view of an insert blank.
Figure 2:
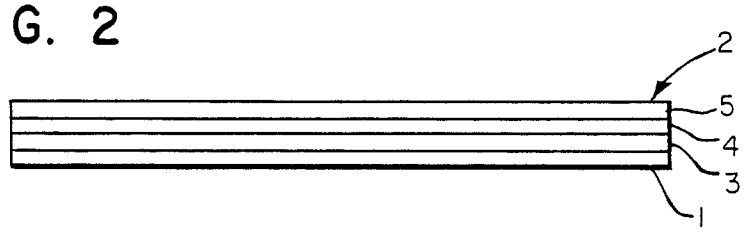
FIG. 2 is a side view of FIG. 1.

The drawings are mostly self-explanatory. In FIGS. 1 and 2, 1 is the aluminum alloy substrate. Alloy selection for such applications is based on factors known in the art preferably aluminum alloy 3003 according to Aluminum Association Inc. (U.S.), or Japanese Industrial Standards is used. At 2 in FIG. 2 is shown the coating system: 3 is the primer, 4 is the intermediate coat and 5 is the topcoat.

Figure 3:
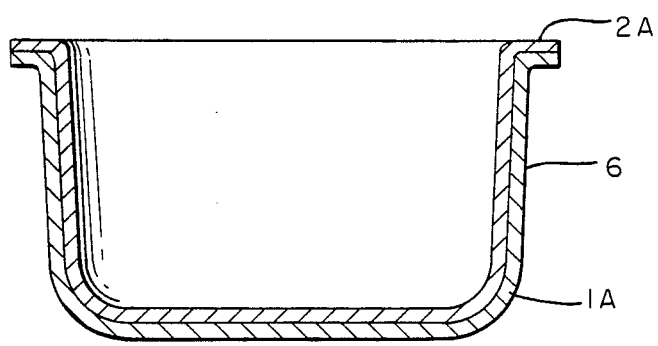
FIG. 3 is a schematic cut-away view of a deep drawn insert.

In FIG. 3, the drawn aluminum insert is shown at 1A, the coating system at 2A, and the location of the anodized layer is at 6. In practice, the outer lip of the drawn insert is often curled under. This is an even more severe deformation of the coating than the original draw process.

In the examples and elsewhere, parts, percentages and proportions are by weight except where indicated otherwise.

The three coat system described herein is applied to grit blasted aluminum, the primer coat followed by the intermediate coat, followed by the topcoat. It is not necessary to dry or cure each coat before applying the next, although it is acceptable or sometimes preferable to allow some drying between coats. Enough primer is applied to give a coating preferably about 5–15 microns thick. The overall film build for all three coatings together is preferably about 12.5 to 87.5 microns, more preferably 30–40 microns. The thickness ratio of the intermediate coat to the topcoat is preferably from 25:75 to 75:25, more preferably about 50:50.

After all three coatings have been applied, the coated substrate is baked to cure the coating preferably at temperatures in the range of 340°–470° C., more preferably 385°–470° C., most preferably about 425° C., for times up to one hour, preferably about 10 minutes, long enough depending on the temperature to cure the coating by causing coalescence, accompanied by degradation and volatilization of the decomposable polymer, preferably an acrylic resin, which is hastened by a catalyst such as Triethanolamine oleate or cerium octoate.

EXAMPLE 1

| Ingredient | Primer % Solids | % of Composition |
|---|---|---|
| PTFE dispersion | 60 | 38.85 |
| Furfuryl alcohol | — | 1.21 |
| Water | — | 29.36 |
| Aqueous dispersion of Amoco Polyamide-imide AI-10 | 30 | 11.10 |
| Silica sol | 30 | 3.13 |
| Ultramarine blue pigment dispersion | 33 | 16.35 |
| | | 100.00 |

EXAMPLE 2

| Ingredient | Intermediate % Solids | % of Composition |
|---|---|---|
| PTFE dispersion | 60 | 68.05 |
| Water | — | 11.69 |
| Channel black dispersion | 26.2 | 0.17 |
| Titanium dioxide dispersion | 45 | 0.93 |
| Ultramarine dispersion | 33 | 0.93 |
| Triethanolamine oleate in toluene and butyl carbitol | 49.3 | 4.40 |
| Acrylic polymer dispersion | 40 | 12.40 |
| TiO2 coated mica pigment | 100 | 1.33 |
| | | 100.00 |

EXAMPLE 3

| Ingredient | Topcoat % Solids | % of Composition |
|---|---|---|
| PTFE dispersion | 60 | 70.01 |
| Water | — | 4.05 |
| Ce—octoate solution in 2-ethyl hexanoic acid | 12 | 12.49 |
| Acrylic polymer dispersion | 40 | 13.02 |
| TiO2 coated mica | 100 | 0.43 |
| | | 100.00 |

After the coated aluminum is formed into ware it is preferable to anodize the ware to improve the corrosion resistance of the coated interior.

Anodization is normally carried out in 10–25% $H_2SO_4$ at 15°–25° C. using direct current at 1.0–3.0 amperes/$dm^2$ current density. Current is applied until a coating thickness of alumina is obtained on the uncoated exterior in the range of 2–10 μm, preferably 5–7 μm.

Tests of coated systems of this invention versus those of the prior art with various ingredients, cycling for 1 hour boiling and 1 hour at 73°–77° C., showed staining of the prior art system at 3 cycles and blistering of the prior art at 15 cycles but no staining or blistering of the system of this invention after 20 cycles.

I claim:

1. A process of deep drawing a coated aluminum alloy blank to make a rice cooker insert comprising
   coating the aluminum alloy blank with a multi-layer release coating which facilitates removal of food residues from the finished rice cooker insert, comprising a primer coat, an intermediate coat and a topcoat,
   said primer coat comprising polytetrafluoroethylene and polyamide-imide in a weight ratio of from 4:1 to 10:1 along with from 1.5 to 10% by weight colloidal silica, based on the solids content of the primer,
   said intermediate coat comprising polytetrafluoroethylene, pigment and coalescing agent which can be decomposed by heat at temperatures used to cure the coating system, and
   said topcoat comprising polytetrafluoroethylene, coalescing agent which can be decomposed by heat at temperatures used to cure the coating system, catalyst to enhance such decomposition, and mica flake or pigment-coated mica flake,
   and drawing the coated blank at a draw ratio between 1.4:1 and 2.5:1 to produce an insert with the coating on the inside of the insert.

2. The process of claim 1 wherein the draw ratio is about 1.7:1.

3. The process of claim 1 wherein the coated insert is anodized on the outside.

* * * * *